E. C. GEORGE.
FLANGED ARTICLE.
APPLICATION FILED JAN. 27, 1915.

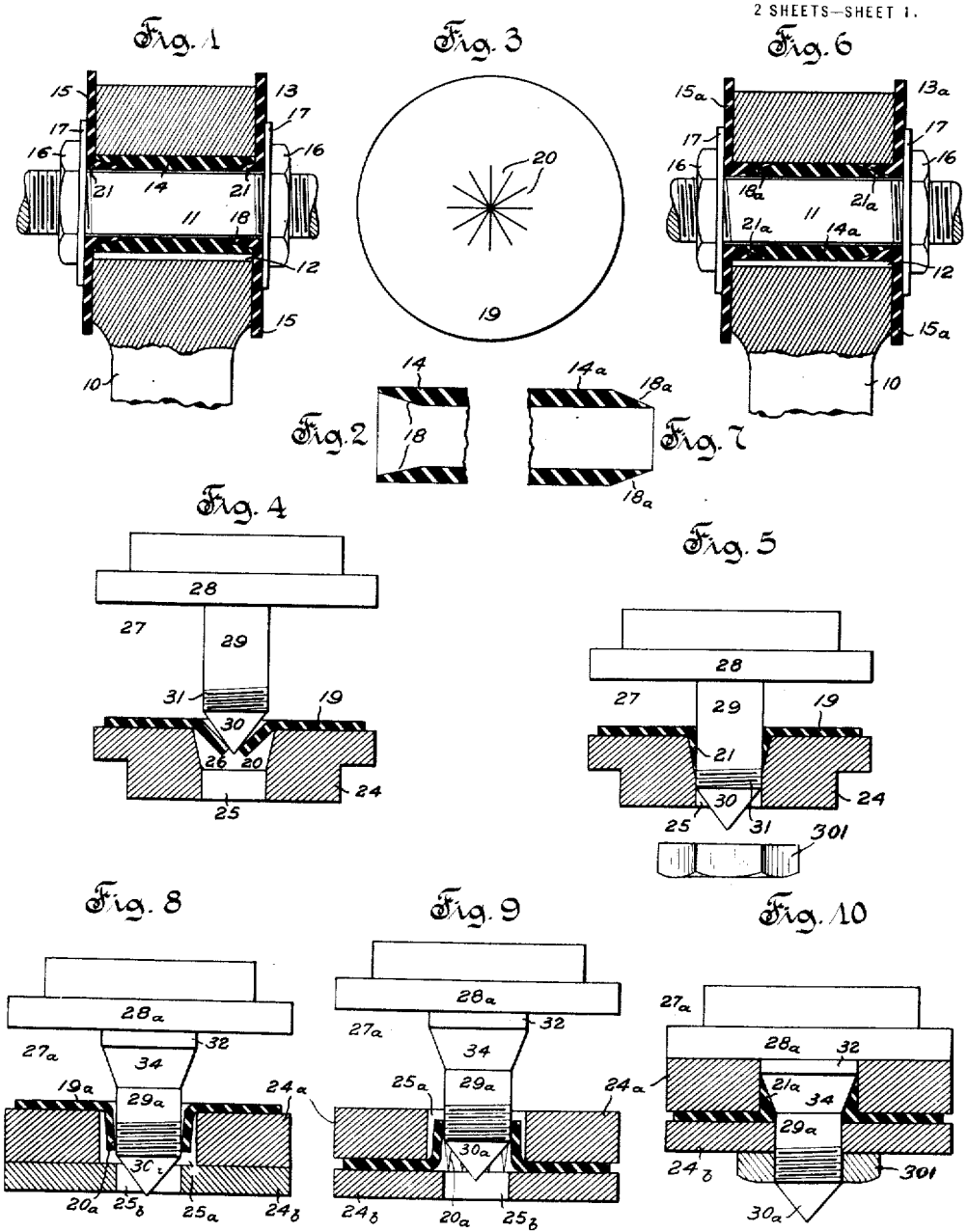

1,309,799.

Patented July 15, 1919.
2 SHEETS—SHEET 2.

Inventor
E. C. George
By
Attorney

UNITED STATES PATENT OFFICE.

EDGAR C. GEORGE, OF NORWOOD, OHIO, ASSIGNOR TO ALLIS-CHALMERS MANUFACTURING COMPANY, OF MILWAUKEE, WISCONSIN, A CORPORATION OF DELAWARE.

FLANGED ARTICLE.

1,309,799.  Specification of Letters Patent.  Patented July 15, 1919.

Application filed January 27, 1915. Serial No. 4,793.

*To all whom it may concern:*

Be it known that EDGAR C. GEORGE, a citizen of the United States, residing at Norwood, in the county of Hamilton and State of Ohio, has invented a certain new and useful Improvement in Flanged Articles, of which the following is a specification.

This invention relates in general to articles of manufacture wherein a body portion is provided with one or more flanges.

In certain cases, as, for instance, where one member is to be insulated from a second member through which the first member passes, it is often desirable to use a flanged tubular element as the insulating medium between the parts. Where the insulating bushing is flanged at both ends and is to be used for insulating telescoping conducting members, it is necessary that at least one flange be secured to the body portion after the conducting members are in place one within another. Further, where the flanges cannot be cast or formed integrally with the body portion of the bushing, the method of forming the flanged bushing and the character of the union between the flange and the body portion are important factors in determining the mechanical and insulating properties of the finished article.

It is an object of this invention to provide an improved construction of an article of manufacture comprising a flanged body portion.

It is a further object of this invention to provide an improved construction of an article of manufacture comprising a body portion provided with flanges at both ends.

It is a further object of this invention to provide an improved construction of a flanged bushing.

It is a further object of this invention to provide an improved method of producing a flanged article.

It is a further object of this invention to provide an improved method of producing a flanged insulating bushing.

These and other objects are attained by this invention, the various novel features of which will appear from the description and drawings, disclosing one embodiment of such invention, and will be particularly pointed out in the claims.

In the accompanying drawings:

Figure 1 is a sectional view through a portion of a dynamo-electric machine showing a flanged insulating bushing embodying features of this invention and used to insulate a brush rod and its securing means from a support.

Fig. 2 is a fragmentary sectional view of the body portion of the bushing shown in Fig. 1.

Fig. 3 is an elevation of a section of material from which the flange portion of the bushing is formed.

Figs. 4 and 5 are partial sectional elevations of apparatus used in forming the flange portions of the bushing shown in Fig. 1, and illustrate steps in the process of manufacture of such flange portions.

Fig. 6 is a view similar to Fig. 1, showing a modified form of flanged bushing.

Fig. 7 is a fragmentary sectional view of the body portion of the bushing shown in Fig. 6.

Figs. 8, 9 and 10 are partial sectional elevations of apparatus used in forming the flange portions of the bushing shown in Fig. 6, and illustrate steps in the process of manufacture of such flange portions.

Figure 11:
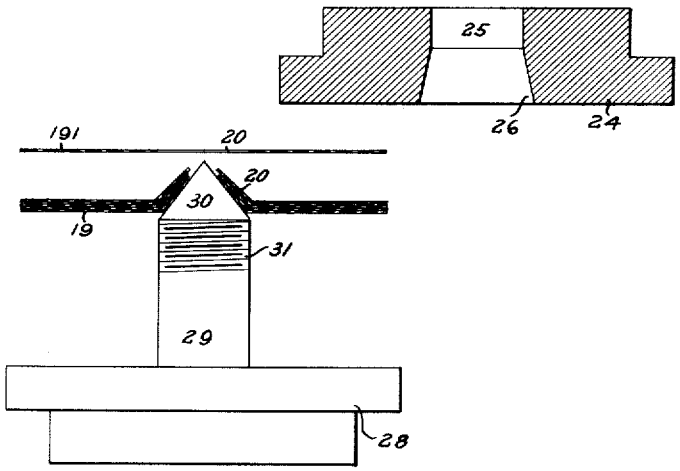
Figs. 11 and 12 are partial sectional elevations of apparatus used in forming the flange portions of the bushing of Fig. 1, and illustrate steps in a modified process of manufacture of such flange portions.

In the drawings, the invention is shown as embodied in a flanged bushing of a type useful for insulating a member from a second member through which the first member passes. As shown in Fig. 1, a member 10, usually associated with the frame of a dynamo-electric machine, acts as a support for a rod 11, such as is used for supporting brushes, the rod passing through an opening 12 in the support 10 and being insulated from the support by a bushing 13 of insulating material. This bushing comprises a tubular body portion 14 and flanges 15 associated with the ends of the body portion 14. The rod 11 is held in place relatively to the support 10 by means of nuts 16 engaging with threaded portions of the rod and bearing upon the flanges 15 through the intermediary of washers 17, the bushing being of such length that the flanges 15 are in contact with the sides of the support 10 adjacent the bore 12.

The end portions of the body portion 14 of the bushing are internally flared or beveled, as indicated at 18 in Fig. 2, and the flanges 15 are provided with tubular extensions 21, tapered or beveled on their outer sides to fit within the ends of body portion 14 and to engage with the flared or beveled portions 18 thereof, the inner diameter of the body portion and of the tubular extensions of the flanges being the same.

In the manufacture of the flanges 15 of the bushing 13, a section of material 19, of a size and thickness equal to those of the flange desired, is made up, preferably, of layers of paper or other suitable insulating material impregnated with a suitable adhesive insulating material. This section of material is partially dried and is cut to the desired form and starred, as indicated in Fig. 3, by making through incisions at about the center thereof which form partially cut sectors 20, the radial length of the incisions being approximately the same as the radius of the bore of the bushing. This section of material or disk 19 is laid on the upper side of a mold 24 having a cylindrical bore 25 outwardly flared at its upper end, as indicated at 26. A coöperating core 27 is made up of a body portion 28 from the under side of which extends a cylindrical die portion 29 of a diameter equal to the desired inner diameter of the tubular extension 21, and a beveled or cone-shaped end 30. The core is moved toward the disk 19, the beveled end 30 passing through the starred portion and folding back the partially cut sectors 20, as indicated in Fig. 4. Continued movement of the core relatively to the mold causes the cylindrical die portion 29 to pass through the disk 19, this action forcing the portions 20 of the disk back against the walls of the flared bore 26 and displacing such portions to form the tubular extension 21, as indicated in Fig. 5. Stated in other words, the material of the portions 20 of the disk is caused to flow, the layers or particles shifting with respect to each other, and thus the gaps between the tapered ends of said portions are substantially filled. The core is preferably moved to such position that the under side of the body part 28 engages the upper side of the part 19. These parts may be drawn to such position and held therein, as by a nut 301 which may engage a threaded portion 31 at the lower end of the die portion 29. The completely formed flange is preferably baked while in the mold, and, when the same is sufficiently hardened, the core and mold are separated and the flange removed.

In assembling the bushing, the body portion 14 and the two oppositely disposed flanges may be passed over the rod 11, the beveled portions 18 of the body portion being treated with a suitable adhesive material of an insulating character, preferably a heavy bakelite varnish being used. The flanges 15 may then be clamped in position with the axial extensions 21 forced against the beveled portions 18, the securing nuts 16 and washers 17, being used for this purpose. With the parts of the bushing in position and the dynamo-electric machine being otherwise ready for operation, a test run is started, heat developed during the heat run of the machine being sufficient to harden the adhesive material used between the beveled portions of the body portion and flanges and to cement the flanges to the body portion, giving a finished article having the required mechanical and dielectric properties.

The modified form of bushing 13$^a$ shown in Fig. 6 comprises a body portion 14$^a$ having its ends externally tapered or beveled, as indicated at 18$^a$ in Fig. 7, and flanges 15$^a$ provided with axial tubular extensions 21$^a$ that are internally beveled or flared to fit the beveled portions 18$^a$ of the body portion 14$^a$.

In forming the flanges 15$^a$ of the bushing 13$^a$, sections of material 19$^a$, similar to the sections 19 used for forming the flanges 15 of the bushing shown in Fig. 1, are used. A section of material or disk 19$^a$ is placed on the upper side of a mold portion 24$^a$, which is in turn disposed upon a mold portion 24$^b$, the mold portion 24$^a$ being provided with a cylindrical bore 25$^a$ of a diameter equal to the outer diameter of the axial extension 21$^a$ of the finished flange, and the mold portion 24$^b$ being provided with a cylindrical bore 25$^b$ of a diameter equal to the inner diameter of the finished bushing. A core portion 27$^a$ comprises a body portion 28$^a$ from the under side of which projects a die portion 32 of such diameter as to fit close within the bore 25$^a$, and a die portion 29$^a$ of such diameter as to fit close within the bore 25$^b$, the two die portions being connected by a beveled portion 34, and the die portion 29$^a$ being provided with a beveled end 30$^a$. The beveled end 30$^a$ and the die portion 29$^a$ of the core are forced through the disk 19$^a$ to fold back the partially cut sectors 20$^a$ to the general position indicated in Fig. 8. The core is then removed and the mold portion 24$^a$ and the disk 19$^a$ are inverted, the disk being disposed between the mold portions 24$^a$ and 24$^b$ which are arranged with the axes of their bores in alinement, and the portions 20$^a$ occupying the bore 25$^a$, the relative position of the parts being that indicated in Fig. 9. The core is then forced downward and the beveled end 30$^a$ and the die portion 29$^a$ passed through the bore 25$^b$ of the mold portion 24$^b$, the beveled die portion 34 pressing the partially cut sectors 20$^a$ back against the wall of the bore 25$^a$, giving these sectors the form of an internally beveled tubular extension 21$^a$, as shown in Fig. 10. The core may be drawn to this position and held therein, as by means of a nut 301 engaging a threaded portion 31$^a$ of the die portion 29ª. The formed flange may be baked while in the mold, and when the same is sufficiently baked, the core and molds are separated and the flange removed.

The flange and body portions of the bushing 13ª may be assembled on the brush rod of a dynamo-electric machine in the manner described in connection with the bushing 13 shown in Fig. 1, and the heat developed during a heat run will be sufficient to thoroughly cement the parts together, giving a finished article of very high mechanical and dielectric strength.

Figure 12:
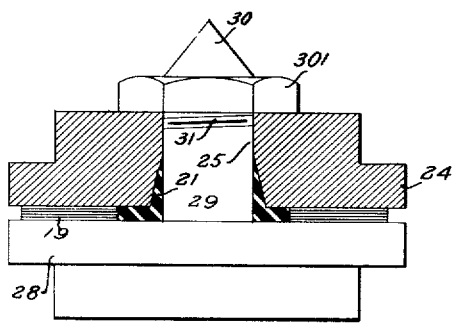

As indicated in Figs. 11 and 12, flange 15 may also be formed by pressing over the die portions 29 and 30, preferably with these parts in position inverted relative to that of Figs. 4 and 5, the required number of prepared sheets or layers of material of the same form as indicated at 19 in Fig. 3 and starred to provide uncut sectors 20, individual sheets or layers being designated by 191 and by using the mold portion 24 to follow up these layers, these operations amounting to a substantial reversal of the steps of the method first described. The mold portion 24 may be urged by the nut 301 to such position that the uncut sectors 20 are forced to occupy the flared portion 26 of the bore 25. The core and mold portions may be suitably held in the proper position, as by the nut 301, and the formed flange may be baked with the parts in these positions.

Again, flanges may be formed in another way, as by being molded from a plastic insulating material and baked while in the mold, and the finished flanges may be then cemented to the body portion of the bushing as generally described above.

It will be obvious that, in accordance with this invention, a flanged article is provided which is comparatively simple and cheap to manufacture, and is possessed of great mechanical strength, due to the increased bearing of the tubular extensions of the flanges on the beveled ends of the body portion, one of the parts being inserted within another and being cemented thereto along the entire engaging surfaces.

It should be understood that it is not desired that the claims be limited to the exact details of construction shown and described, for obvious modifications will occur to a person skilled in the art.

It is claimed and desired to secure by Letters Patent:

1. A method of forming a flanged insulating bushing which comprises forming a tubular body portion with beveled ends, distorting sheets of insulating material to provide flanges having oppositely beveled axial, tubular extensions, and uniting said flanges to said body portion with beveled surfaces of the parts in engagement.

2. A method of forming a flanged insulating bushing which comprises forming a tubular body portion with beveled ends, distorting a sheet of insulating material to provide a flange portion having an oppositely beveled, axial, tubular extension, and uniting said oppositely beveled parts with the beveled surfaces thereof in engagement.

3. A method of forming an article of manufacture which comprises making through incisions in a laminated sheet of material, pressing back the material between said incisions at approximately right angles to the body of the sheet, and distorting the pressed back material to form a continuous, tubular, beveled extension.

4. A method of forming a flanged insulatting bushing which comprises forming a tubular body portion with a beveled surface, forming a flange with an oppositely beveled surface, assembling said body and flange portions on a conducting element with said beveled surfaces adjacent each other and a cementitious material therebetween, and passing an electric current through said conducting element to bake said cementitious material and cement said body and flange portions together.

5. A method of forming a flanged insulating bushing which comprises forming a tubular body portion with beveled ends, forming flanges having axial, tubular extensions beveled oppositely to the beveled ends of said body portion, assembling said body portion and flanges on a conducting element with the beveled surfaces of the body portion and flanges immediately adjacent each other, and cementitious material therebetween, and passing an electric current through the conducting element to bake said cementitious material and cement the body portion and flanges together.

6. A method of forming a flanged insulating bushing which comprises forming a tubular element with a beveled end portion, forming a second tubular element with an oppositely beveled end portion and a radial flange, assembling said tubular elements on an element of electrically conductive material with said oppositely beveled surfaces closely adjacent each other and a layer of cementitious material between said surfaces, and causing an electric current to flow through said conductive element to bake said cementitious material and unite said tubular elements.

7. A method of forming an insulating bushing which comprises forming tubular elements with oppositely beveled end portions, assembling said tubular elements on an element of electrically conductive material with said oppositely beveled surfaces closely adjacent each other and a layer of cementitious material between said surfaces, and causing an electric current to flow through said conductive element to bake said cementitious material and unite said tubular elements.

8. A method of forming a flanged article which comprises beveling an end portion of said article, distorting a piece of sheet material to form a flange portion having an axial extension with a bevel opposite to that of said first portion and uniting said portions with said axial extension extending toward the opposite end of said article and the beveled surfaces of the parts in engagement.

9. A method of forming an article of manufacture which comprises puncturing a sheet of flowable hardenable material thereby causing the parts adjacent said puncture to be bent at an angle to said sheet and whereby said parts are given a tapering cross-section in the general direction of their length, and then hardening the flowable material.

10. As an article of manufacture, a bushing comprising a tubular portion having a beveled end and at least one flange comprising a laminated sheet of material having an integral tubular beveled extension to coact with the said beveled end of the body portion.

11. As an article of manufacture, a bushing comprising a tubular portion and two end-flanges made of a laminated sheet of material, said tubular portion comprising integral tubular beveled extensions on said flanges.

12. As an article of manufacture, a flange-like member made of a unitary piece of laminated material, said member having an aperture bounded by an integral tubular extension.

13. As an article of manufacture, a flange-like member made of a unitary piece of laminated material, said member having an aperture bounded by an integral tubular beveled extension.

14. A method of forming an article of manufacture which comprises perforating a sheet of flowable material so that the edge-portions of the perforation are indented and bent at an angle to said sheet, and compressing said edge-portions so that the said portions will become substantially non-indented.

15. A method of forming an article of manufacture which comprises perforating a sheet of flowable insulating material so that the edge-portions of the perforation are indented and bent at an angle to said sheet, and compressing said edge-portions so that the said portions will become substantially non-indented.

16. A method of forming an article of manufacture which comprises perforating a sheet of flowable laminated insulating material so that the edge-portions of the perforation are indented and bent at an angle to said sheet, and compressing said edge-portions so that the said portions will become substantially non-indented.

17. A method of forming an article of manufacture which comprises perforating a sheet of flowable laminated material so that the edge-portions of the perforations are indented and bent at an angle to said sheet, and compressing said edge-portions so that the said portions will become substantially non-indented and form a beveled tubular extension.

18. A method of forming an article of manufacture which comprises puncturing a sheet of flowable laminated material thereby causing the parts adjacent said puncture to be bent at an angle to said sheet, and compressing said parts to cause them to flow to form a substantially continuous tubular extension.

19. As an article of manufacture, a flange-like member made of a unitary piece of laminated insulating material, said member having an aperture bounded by an integral beveled tubular extension.

In testimony whereof the signature of the inventor is affixed hereto in the presence of two witnesses.

EDGAR C. GEORGE.

Witnesses:
FRASER JEFFREY,
G. E. REIFF.